(12) United States Patent
Santobianco et al.

(10) Patent No.: US 6,258,894 B1
(45) Date of Patent: Jul. 10, 2001

(54) METHODS OF CURING UNSATURATED POLYMERS USING TERTIARY AROMATIC AMINE CURE PROMOTERS

(75) Inventors: John Gabriel Santobianco, Ocean Springs; Carey Cecil Geiger, Gautier, both of MS (US); Joseph Stanton Bowers, Jr., Mobile, AL (US)

(73) Assignee: First Chemical Corporation, Pascagoula, MS (US)

( * ) Notice: Subject to any disclaimer, the term of this patent is extended or adjusted under 35 U.S.C. 154(b) by 0 days.

(21) Appl. No.: 08/958,737

(22) Filed: Oct. 27, 1997

Related U.S. Application Data

(63) Continuation of application No. 08/624,980, filed on Mar. 28, 1996, now abandoned.

(51) Int. Cl.[7] .................................................. C08C 19/22
(52) U.S. Cl. ............................................................ 525/379
(58) Field of Search ................................................ 525/379

(56) References Cited

U.S. PATENT DOCUMENTS

| 2,659,719 | 11/1953 | Dickey et al. ................ 260/158 |
| 3,950,287 | * 4/1976 | Coats et al. . |
| 4,012,542 | * 3/1977 | Oswitch et al. . |
| 4,421,879 | 12/1983 | Eimers et al. . |
| 4,666,978 | 5/1987 | Storey et al. .................... 525/35 |

FOREIGN PATENT DOCUMENTS

| 0 074 564 | 3/1983 | (EP) . |
| 1 228 452 | 4/1971 | (GB) . |
| 1 415 059 | 11/1975 | (GB) . |
| 1 415 060 | 11/1975 | (GB) . |
| 1 476 368 | 6/1977 | (GB) . |
| 1 540 228 | 2/1979 | (GB) . |
| 56-166270 | 12/1981 | (JP) . |

OTHER PUBLICATIONS

Chemical Abstracts, vol. 81, No. 20, Nov. 18, 1974, Columbus, Ohio, US; abstract No. 121658, Demmler et al.: "cold curing of —" XP002035515 see abstract & Kunststoffe, vol. 64, No. 2, 1974, pp. 78–86.

Chemical Abstracts, vol. 71, No. 16 Oct. 20, 1969, Columbus, Ohio, US; abstract No. 71466, Werts et al.: "Cure promoters for —unsaturated polyesters" XP002035516 see abstract & U.S. Pat. Offic., Gaz., vol. 864, No. 3, 1969, pp. 731 "us 790851 I".

Dnebosky, J. et al.; Polymerizable Amines as Promoters of Cold–Curing Resins and Composites; J. Dent. Res. (1975), 54(4), 772–6.

Qiu, Kunyuan et al.; The Effects Of N–2–Hydroxyethyl–n–methyl–p–toluidine On Methyl Methacrylate Radical Polymerization and Acrylonitrile Photoinduced Polymerization; Chin. J. Polym. Sci. (1992), 10(3), 250–7.

Bent, R.L. et al.; Chemical Constitution, Electrochemical, Photographic and Allergenic Properties of p–Amino–N, N–dialkylanilines; J. Am. Chem. Soc. 73, 3100–25 (1951).

Lattes, Armand et al.; Reactions of Glycol Monochlorohydrin With Some Amines; Bull. Soc. Chim. France 1965(7), 2037–43(Fr.).

Teplov, N.E. et al.; Synthesis of O,O–diethyl S–β–(Arylmethylamino)–ethyl Phosphorothiolates and Their Methyl Methosulfates; pp. 1680–1684; Institute of Hetero–organic Compounds of the USSR Academy of Sciences; Translated from Zhurnal Organicheskoi Khimii, vol. 1, No. 9, pp. 1658–1662, Sep., 1965.

\* cited by examiner

Primary Examiner—Edward J. Cain
(74) Attorney, Agent, or Firm—Alston & Bird LLP

(57) ABSTRACT

Methods of promoting the cure of unsaturated polymer resins with a peroxide initiator by including as a promotor N-alkyl-N-(2-hydroxyalkyl)-p-toluidines. The use of the tertiary aromatic amines as a promotor provides a fast cure at a wide range of temperatures. Polymerizable compositions and methods of applying the same to a surface are also described.

24 Claims, 4 Drawing Sheets

METHODS OF CURING UNSATURATED POLYMERS USING TERTIARY AROMATIC AMINE CURE PROMOTERS

This application is a continuation of copending application Ser. No. 08/624,980, filed Mar. 28, 1996 now abandoned.

FIELD OF THE INVENTION

The present invention relates to methods for curing unsaturated polymer resins, and more particularly to curing such resins with a peroxide initiator in the presence of a cure promoter.

BACKGROUND OF THE INVENTION

The term polyester refers generally to the group of synthetic resins that are polycondensation products of dicarboxylic acids with dihydroxy alcohols. The term unsaturated polyester resin, as used herein, designates a linear-type alkyd possessing carbon-to-carbon double bond unsaturation in the polymer chain. These unsaturated polyesters may be crosslinked and thus cured by reaction with monomers such as styrene or diallyl-phthalate, usually in the presence of a peroxide to form insoluble and infusible resins without the formation of a by-product during the curing reaction. Other types of polymer resins are also known which include carbon-to-carbon double bond unsaturation in the polymer chain, and which can also be crosslinked and cured, such as urethane acrylates, epoxy acrylates, and the like.

Because of their versatility and cost effectiveness, these resins possess broad commercial utility. Such utilities include, but are not limited to, low-pressure laminating; attractive and durable coatings for concrete, masonry, wood, plastic, wallboard, and metal; specialty resins targeted for synthetic marble, boat hulls, polymer concrete, mine-bolt resins, transfer molding, restorative dentistry, automotive body repair, and the like.

Tertiary aromatic amines are widely used as cure promoters or accelerators for unsaturated resins in the presence of peroxide initiators. Exemplary tertiary amines useful as cure promoters include, for example, N,N-dimethylaniline (DMA), N,N-diethylaniline (DEA), N-(2-hydroxyethyl)-N-methyl aniline, N-(2-hydroxyethyl)-N-ethyl aniline, N,N-bis-(2-hydroxyethyl)-m-toluidine, N-(2-hydroxyethyl)-N-[2-(2-hydroxyethoxy)ethylaniline, N,N-bis-(2-hydroxyethyl)-p-toluidine (HEPT), and N,N-dimethyl-p-toluidine (DMPT). However, cure rates for these types of compounds could be improved.

Further, as such uses demonstrate, polyester resins and other crosslinkable resins are often used in environments, i.e., outdoors, where temperatures cannot be easily controlled. Accordingly, it has become increasingly important to increase the cure rate of such polymer resins at low temperatures without detracting from the physical properties of the resins. The effectiveness of tertiary amine cure promoters such as those listed above, however, can fall off dramatically at low temperatures. Further, while the N,N-dimethyltoluidines are known as effective cure promoters at temperatures as low as 10° C. to 15° C., these compounds become much less effective at temperatures approaching or below 0° C.

In addition, the lower dialkylanilines and toluidines can be toxic and can produce irritating and offensive odors; can be corrosive; and cannot sufficiently cure the polymer surface.

OBJECTS AND SUMMARY OF THE INVENTION

It is accordingly an object of the present invention to provide a method for curing unsaturated polymer resins in the presence of a peroxide initiator using a cure promoter which will provide a fast cure without adversely affecting the physical properties of the resins.

It is another object of the present invention to provide a method for curing unsaturated polymer resins in the presence of a peroxide initiator using a cure promoter which will provide a fast cure at low temperatures.

It is another object of the present invention to provide a method for curing unsaturated polymer resins in the presence of a peroxide initiator using a cure promoter which is essentially odorless.

It is yet another object of the present invention to provide a method for curing unsaturated polymer resins in the presence of a peroxide initiator using a cure promoter which is less toxic than lower dialkylanilines and toluidines.

It is yet another object of the present invention to provide a method for curing unsaturated polymer resins in the presence of a peroxide initiator using a cure promoter which is substantially non-corrosive.

It is yet another object of the present invention to provide a method for curing unsaturated polymer resins in the presence of a peroxide initiator using a cure promoter which can provide a more complete surface cure.

It is yet another object of the present invention to provide a method for curing unsaturated polymer resins in the presence of a peroxide initiator using a cure promoter which can be incorporated into the polymer backbone.

It is yet another object of the present invention to provide a method for curing unsaturated polymer resins in the presence of a peroxide initiator using a cure promoter which is relatively inexpensive and thus cost effective.

These and other objects of the present invention will become apparent from the following general and detailed description of the invention. The objects of the present invention are accomplished based on the discovery that compounds according to Formula (I) below can be very effective cure promoters. In the invention, an unsaturated polymer is cured with a peroxide initiator in the presence of a promoter according to Formula I:

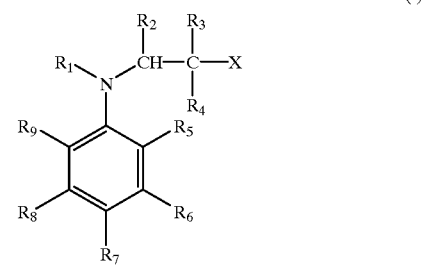

wherein:
R$_1$ is linear or branched C1 to C6 alkyl or C3 to C6 cycloalkyl;
R$_2$ is H, linear or branched C1 to C6 alkyl or C3 to C6 cycloalkyl, wherein said C1 to C6 alkyl or C3 to C6 cycloalkyl is optionally substituted at the C1 or C3 position, respectively, by X as defined below;
R$_3$ and R$_4$ are each independently selected from the group consisting of H, linear or branched C1 to C6 alkyl, and C3 to C6 cycloalkyl;
R$_5$, R$_6$, R$_7$, R$_8$, and R$_9$ are each independently selected from the group consisting of H, linear or branched C1 to C6 alkyl, C3 to C6 cycloalkyl, and C1 to C6 alkoxy; and X is OH, OR$_1$, CN, OC(O)R$_1$, O[(CH$_2$)$_m$O]$_n$H or O[(CH$_2$)$_m$O]$_n$R$_1$, wherein m=1 to 6 and n=1 to 6, and wherein R$_1$ is as defined above.

Currently preferred are compounds of Formula (I) wherein:

R$_1$ is methyl or ethyl;

R$_2$ is H or hydroxymethyl;

R$_3$ or R$_4$ are each independently selected from the group consisting of H, methyl and ethyl;

R$_5$, R$_6$, R$_7$, R$_8$, and R$_9$ are each independently selected from the group consisting of H and methyl; and X is OH or O[(CH$_2$)$_m$O]$_n$H, wherein m=2 and n=1 to 6.

Exemplary compounds of Formula I in accordance with the invention include, but are not limited to, N-methyl-N-(2-hydroxyethyl)-p-toluidine (MHPT); N-ethyl-N-(2-hydroxyethyl)-p-toluidine (EHPT); and N-methyl-N-(2-hydroxypropyl)-p-toluidine (2HPMT).

In the invention, the promoter is present in an amount sufficient to increase the cure rate of the unsaturated resin to about 75%, preferably about 60%, and more preferably about 50%, of the cure time of the unsaturated resin measured using N,N-dimethyl-p-toluidine. The cure promoter can be present, for example, in an amount between about 0.01 and about 5 percent by weight based on the weight of unsaturated resin, and preferably in an amount between about 0.1 and about 0.5 percent by weight. The cure promoters are particularly effective for use with unsaturated polyester resins as known in the art, but are also useful as cure promoters for other unsaturated polymer resins, such as polyurethane acrylates, epoxy acrylates, and the like.

The use of the cure promoters of Formula I provides a substantial increase in gel and cure rates of polymerizable unsaturated polymers, as compared to conventional tertiary amine cure promoters, such as DMA, DMPT, and the like. Further, the use of these cure promoters provides advantages in terms of gel and cure rates at a wide range of temperatures. The cure promoters can be very effective cure promoters at ambient temperatures, i.e., about 20–25° C., and can also be effective at low temperatures, i.e., as low as 15° C., 0° C. and lower. Promoters of Formula I gradually lose effectiveness at decreasing temperatures. In contrast, various other tertiary amines, such as DMA, DEA, HEPT and DMPT, dramatically lose their effectiveness as a cure promotor at decreasing temperatures, i.e., particularly temperatures at or below 0° C.

The present invention also provides polymerizable compositions characterized by accelerated polymerization, which include a polymerizable unsaturated polymer resin; a peroxide initiator; and a cure promoter according to Formula I; as well as methods for bonding a polymerizable composition to a surface of a substrate.

BRIEF DESCRIPTION OF THE DRAWINGS

Some of the features and advantages of the invention having been stated, others will become apparent from the detailed description which follows, and the accompanying drawings which form a part of the original disclosure of this invention, and in which.

DETAILED DESCRIPTION OF THE INVENTION

Figure 1:
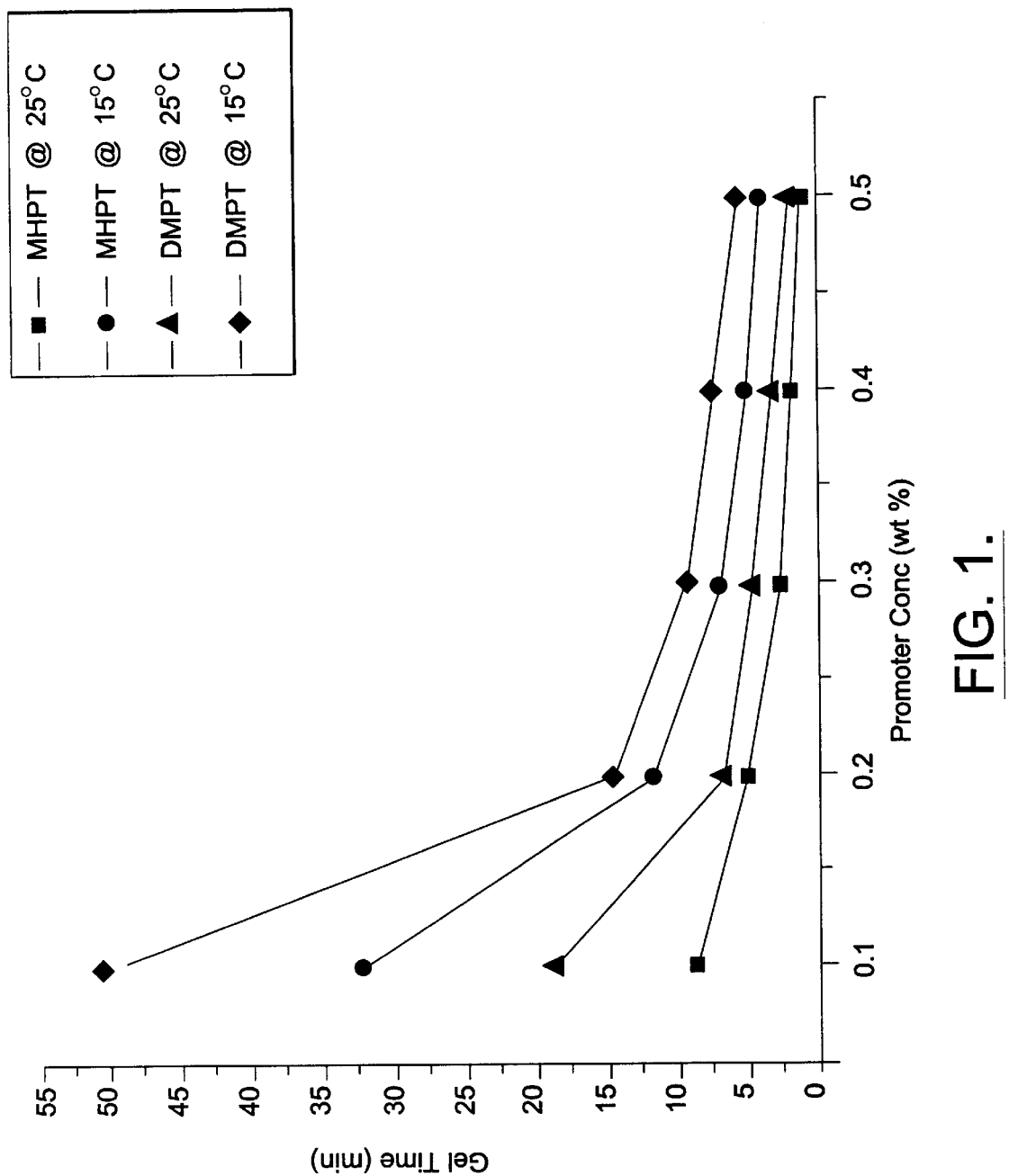
FIG. 1 is a graph illustrating gel time in minutes for an unsaturated polyester resin versus promotor concentration in weight percentage using 1% benzoyl peroxide at 15° C. and 25° C.

The present invention will now be described more fully hereinafter with reference to the accompanying drawings, in which illustrative embodiments of the invention are shown. This invention may, however, be embodied in many different forms and should not be construed as limited to the embodiment set forth in here. Rather, this embodiment is provided so that the disclosure will be thorough and complete, and will fully convey the scope of the invention to those skilled in the art.

The cure promoters of the invention are compounds according to Formula (I) below:

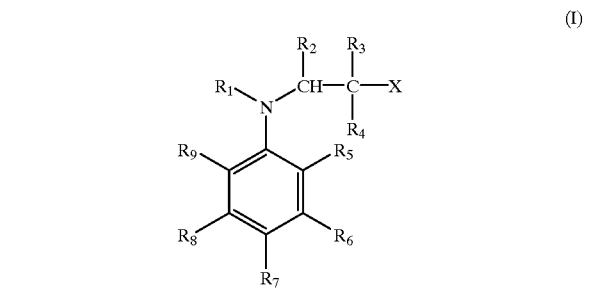

(I)

wherein:

R$_1$ is linear or branched C1 to C6 alkyl or C3 to C6 cycloalkyl;

R$_2$ is H, linear or branched C1 to C6 alkyl, or C3 to C6 cycloalkyl, wherein said C1 to C6 alkyl or C3 to C6 cycloalkyl is optionally substituted at the C1 or C3 position, respectively, by X as defined below;

R$_3$ and R$_4$ are each independently selected from the group consisting of H, linear or branched C1 to C6 alkyl, and C3 to C6 cycloalkyl;

R$_5$, R$_6$, R$_7$, R$_8$, and R$_9$ are each independently selected from the group consisting of H, linear or branched C1 to C6 alkyl, C3 to C6 cycloalkyl, and C1 to C6 alkoxy; and X is OH, OR$_1$, CN, OC(O)R$_1$, O[(CH$_2$)$_m$O]$_n$H or O[(CH$_2$)$_m$O]$_n$R$_1$, wherein m=1 to 6 and n=1 to 6, and wherein R$_1$ is as defined above.

Currently preferred are compounds of Formula (I) wherein:

R$_1$ is methyl or ethyl;

R$_2$ is H or hydroxymethyl;

R$_3$ or R$_4$ are each independently selected from the group consisting of H, methyl and ethyl;

R$_5$, R$_6$, R$_7$, R$_8$, and R$_9$ are each independently selected from the group consisting of H and methyl; and X is OH or O[(CH$_2$)$_m$O]$_n$H, wherein m=2 and n=1 to 6.

As used herein, the term "C1 to C6 alkyl" refers to C1 to C6 linear or branched alkyl, such as methyl, ethyl, propyl, butyl, isopropyl, sec-butyl, and tert-butyl, butyl, pentyl, isopentyl, and hexyl. The term "cycloalkyl" as used herein refers to C3 to C6 cyclic alkyl, such as cyclopropyl, cyclobutyl, cyclopentyl, and cyclohexyl. The term "alkoxy" as used herein refers to C1 to C6 linear or branched oxygen-substituted alkyl, such as methoxy, ethoxy, propyloxy, butyloxy, isopropyloxy, and t-butyloxy.

Exemplary compounds of Formula I in accordance with the invention include, but are not limited to, N-methyl-N-(2-hydroxyethyl)-p-toluidine (MHPT); N-ethyl-N-(2-hydroxyethyl)-p-toluidine (EHPT); and N-methyl-N-(2-hydroxypropyl)-p-toluidine (2HPMT).

In accordance with the present invention, the compounds of Formula I have been found to provide a substantial increase in gel and cure rates of polymerizable unsaturated resins in the presence of a peroxide initiator, as compared to conventional tertiary amine cure promoters, such as DMA, DMPT, and the like. Further, the use of these cure promoters provides advantages in terms of gel and cure rates at a wide range of temperatures. That is, the cure promoters in accordance with the present invention can be very effective at ambient temperatures, i.e., about 20–25° C. However, the use of the cure promoters of Formula I is also very advantageous at low temperatures, i.e., as low as 15° C., 0° C. and lower.

This result is unexpected and surprising because various other tertiary amines, such as DMA, DEA, HEPT and DMPT, dramatically lose their effectiveness as cure promoters at decreasing temperatures, i.e., particularly temperatures at or below 0° C. That the cure promoters of Formula I also provide increased gel and cure rates at a wide range of temperatures is also unexpected and surprising based upon the structure of the amines of the invention. For example, the structure of the promoters of the invention (for example MHPT) would lead one skilled in the art to expect the reactivity of the cure promoters of the invention to fall between that of N,N-dialkyl-p-toluidines (for example DMPT) and N,N-dihydroxyalkyl-p-toluidines (for example HEPT). Instead, the reactivity of MHPT is much greater than DMPT, which is in turn greater than HEPT.

The compounds of Formula I used in accordance with the method of the invention can be used in quantities between about 0.01 and about 5 percent by weight, preferably in quantities between about 0.1 and about 1 percent by weight, and more preferably between about 0.1 and 0.5 percent by weight, based on weight of the unsaturated resin.

The compounds used in accordance with the invention can be used individually. However, mixtures thereof can also be used.

The compounds of the invention can be prepared using techniques as known in the art, for example, alkylation of an appropriate N-alkyl-p-toluidine to provide, for example, an N-alkyl-N-(2-hydroxyalkyl)-p-toluidine. For example, MHPT can be prepared by adding a slight molar excess of ethylene oxide to N-methyl-p-toluidine and subjecting the mixture to conditions sufficient to ethoxylate the toluidine compound. The ethoxylation can be performed by methods known in the art.

The compounds of the present invention can also be synthesized by alkylation of an appropriate N-hydroxyalkyl-p-toluidine. For example, MHPT can be prepared by adding formaldehyde and hydrogen to a mixture of N-hydroxyethyl-p-toluidine and palladium on a carbon catalyst under appropriate temperature and pressure conditions, such as at 120° C. and 120 psig.

The material obtained by the first route is usable directly out of the reactor. No further purification is required, but distillation can be performed to provide a purer product. The material from the second route should be purified before use.

Polyesters which are useful according to the present invention include conventional unsaturated polyester resins known in the art. Thus, the unsaturated polyesters may be obtained by reaction of approximately equivalent amounts of a polyvalent alcohol such as ethylene glycol, diethylene glycol, triethylene glycol, trimethylene glycol, propylene glycol, pentaerythritol, and other diols or polyols with an unsaturated dibasic carboxylic acid or carboxylic anhydride such as maleic acid, maleic anhydride, fumaric acid, itaconic acid, or citraconic acid. These unsaturated dibasic carboxylic acids or anhydrides are often used in combination with aromatic and/or saturated aliphatic dicarboxylic acids or the anhydrides derived therefrom, such as phthalic acid, phthalic anhydride, isophthalic acid, tetrachlorophthalic acid, malonic acid, adipic acid, sebacic acid, tartaric acid, and the like.

Unsaturated polyesters containing vinyl groups or vinylidene groups may be obtained by polycondensation of alpha, beta-unsaturated monocarboxylic acids such as acrylic or methacrylic acid, with mono-, di- or polyhydric alcohols. Exemplary alcohols include methanol, ethanol, isopropanol, cyclohexanol, phenol, ethylene glycol, propylene glycol, 2,2-bis(4-hydroxyphenyl)propane, 2,2-bis(4-hydroxycyclohexyl)propane, 2,2-bis(4-beta-hydroxyethyloxy-phenyl)propane, pentaerythritol and dimers thereof, trimethol propane and a glycerol, and the complex diols or polyols. Unsaturated polyesters containing vinyl groups or vinylidene groups also may be obtained by reacting alpha, beta-unsaturated monocarboxylic acids with compounds containing epoxy groups, such as bisphenol A bis(glycidyl ether).

Further, the unsaturated polyesters can be dissolved in monomers copolymerizable with the polyester, which contain one or more C=C groups such as styrene, vinyl toluene, methylmethacrylate, ethyleneglycolmethacrylate, and the like, as is also conventional. The preferred solutions are those which contain from about 70 to 50 percent by weight of unsaturated polyester and 30 to 50 percent by weight of copolymerizable monomer. Styrene is a preferred copolymerizable monomer.

Although the invention has been described in detail with regard to the use of the compounds according to Formula (I) as cure promoters for unsaturated polyester resins, the skilled artisan will appreciate that the compounds of the invention can also be used with other unsaturated polymers capable of being cured using peroxide initiators. Such unsaturated polymers include conventional polyurethane acrylate resins known in the art. The unsaturated polyurethane may be obtained by reaction of a polyisocyanate, such as toluene diisocyanate, diphenylmethane diisocyanate, hexamethylene diisocyanate, and the like, with an appropriate compound containing at least two active hydrogen atoms, such as a polyol or a polyamine. Exemplary polyols include ethylene glycol, diethylene glycol, triethylene glycol, trimethylene glycol, propylene glycol, pentaerythritol, and other diols or polyols. Urethane polymers may be used in the form of homopolymers or, more preferably, with various other monomers which can be copolymerized therewith. For example, urethane polymers can be prepared by reacting any of a variety of acrylic comonomers, such as acrylic and methacrylic acids, and their amides, esters, salts and corresponding nitriles, with the polyurethane resin. Particularly suitable comonomers for such polymers are methyl methacrylate, ethyl acrylate and acrylonitrile.

Yet another exemplary unsaturated polymer which can be treated using the compounds of Formula (I) include unsaturated epoxy resins known in the art. Unsaturated epoxy resins may be obtained by reaction of an epoxide group (resulting form the union of an oxygen atom with two other atoms, usually carbon), such as epichlorohydrin, oxidized polyolefins, for example ethylene oxide, with an aliphatic or aromatic alcohol such as bisphenol A, glycerol, etc. As with the unsaturated polymers described above, the epoxy resins may be used in the form of homopolymers or copolymers with various other comonomers which can be reacted therewith, including various acrylic monomers, such as acrylic and methacrylic acids, and their amides, esters, salts and corresponding nitrites.

To improve the stability of the unsaturated polyesters, inhibitors are commonly used in amounts ranging from about 0.001 to 0.03 percent by weight. The most commonly used inhibitors are hydroquinone, hydroquinone monomethyl ether, quinone, and p-tert-butyl catechol. To more accurately control the comparison tests above, no inhibitor was used in the comparative examples.

The polymerization or copolymerization initiators which can be used are those conventionally available and include hydrogen peroxide, the ketone peroxides, such as acetylacetone peroxide, methylethylketone peroxide, cyclohexanone peroxide and methylisobutylketone peroxide; the diacyl peroxides, such as benzoyl peroxide, lauroyl peroxide, isobutyryl peroxide, acetyl peroxide, 2,4-dichlorobenzoyl peroxide, succinic acid peroxide, decanoyl peroxide, diisononanoyl peroxide; the peresters, such as tert-butyl peroxide-2-ethyl hexanoate; the perketals, such as 1,1-ditert-butylperoxy-3,3,5-trimethyl cyclohexane and dialkyl peroxides, such as 1,3-bis(tert-butylperoxyisopropyl) benzene. The diacyl peroxides, and particularly benzoyl peroxide, are the preferred initiators. The initiators are used in amounts known in the art, for example, for peroxide initiators, between about 0.5 and 10 percent by weight.

The present invention will be further illustrated by the following non-limiting examples.

EXAMPLE 1

Synthesis of N-methyl-N-(2-hydroxyethyl)-p-toluidine (MHPT)

N-(2-hydroxyethyl)-p-toluidine, 50 g, was combined with 1 g 5% palladium on carbon catalyst and charged to a pressure reactor. The pressure reactor was heated to 120° C. and fed hydrogen gas to maintain 120 psig pressure. Formaldehyde, 178 g 37% solution in water, was fed to the pressure reactor over 10 hours. After hydrogen uptake ceased, the reaction mass was filtered to remove catalyst and decanted to separate the aqueous phase.

The organic phase was charged to a vacuum distillation apparatus. Water and low boilers were removed. N-methyl-N-(2-hydroxyethyl)-p-toluidine product was collected at overhead temperatures around 148° C. Melting point was 28–30° C.

EXAMPLE 2

Synthesis of N-ethyl-N-(2-hydroxyethyl)-p-toluidine (EHPT)

N-ethyl-N-(2-hydroxyethyl)-p-toluidine (EHPT) was prepared substantially as described above in Example 1, except that acetaldehyde was added to ethylate N-(2-hydroxyethyl)-p-toluidine.

EXAMPLE 3

Synthesis of N-methyl-N-(2-hydroxypropyl)-p-toluidine (2HPMT)

N-methyl-p-toluidine, 29.3 g, and methanol, 50 g, were placed in a reactor. Propylene oxide, 25.4 g, was slowly added to the reactor over two hours. Afterwards, the reactor was heated under reflux for 6 hours. The low boilers were removed by distillation. Then, the mixture was vacuum distilled to give 2HPMT. The boiling point is 92° C. at 5 mm Hg.

EXAMPLE 4

Comparison of Gel and Cure Times of MHPT and DMPT at 15° C. and 25° C.

The thus synthesized MHPT was compared to N,N-dimethyl-p-toluidine (DMPT) as described below with regard to gel and curing rates of an unsaturated polyester resin at varying promoter concentrations levels and varying temperatures. Benzoyl peroxide was used as a 50% dispersion in tricresyl phosphate and which was used as the initiator for the curing reaction. The polyester resin used was an unpromoted, high-reactivity resin based on ortho phthalic acid and containing 20 to 25 percent free styrene monomer, available under the trade name Polylite 44-289 from Reichhold Chemical Company.

MHPT was compared to DMPT as cure reaction promoters at five different concentrations (0.1. 0.2, 0.3. 0.4 and 0.5 percent by weight) for the unsaturated polyester resin. All the curing reactions were performed using 1% benzoyl peroxide as initiator at two different reaction temperatures (15° C. and 25° C.). The balance of the composition was the polyester resin.

The base formulation used in this experimental was as follows:

| | |
|---|---|
| Benzoyl peroxide dispersion (50%) | 2.00 g |
| Tertiary aromatic amine | 0.1 to 0.5 g |
| Polyester resin | Balance |
| Total mass | =100 g |

All curing reactions were performed at either 15° C. or 25° C. using a wide-mouth ½ pint mason jar suspended in a constant temperature water bath. A reacting mass of 100 grams was used in all cases. The procedure utilized was as follows: The amine promotor was weighed into a clean-dry jar to an accuracy of ±0.001 gram using a ground glass syringe for transfer. The proper quantity of resin was then weighed into the jar. The jar was placed into the constant temperature water bath and allowed to equilibrate for 30 minutes.

Next, 2±0.0075 grams benzoyl peroxide dispersion was weighed onto the end of a wooden tongue blade. A lab timer was activated, and the benzoyl dispersion was mixed thoroughly into the resin by stirring for three minutes with the blade, gently to avoid air entrapment. The reacting mass was probed periodically with the blade, and the gel time was recorded as the time from introduction of the initiator to the point when the resin snapped back from the blade in a rubbery manner.

Next, a thermometer wrapped in aluminum foil was inserted into the center of the gelled resin. The cure time was recorded as the time from addition of the initiator to peak exotherm, i.e., the maximum temperature reached.

Figure 2:
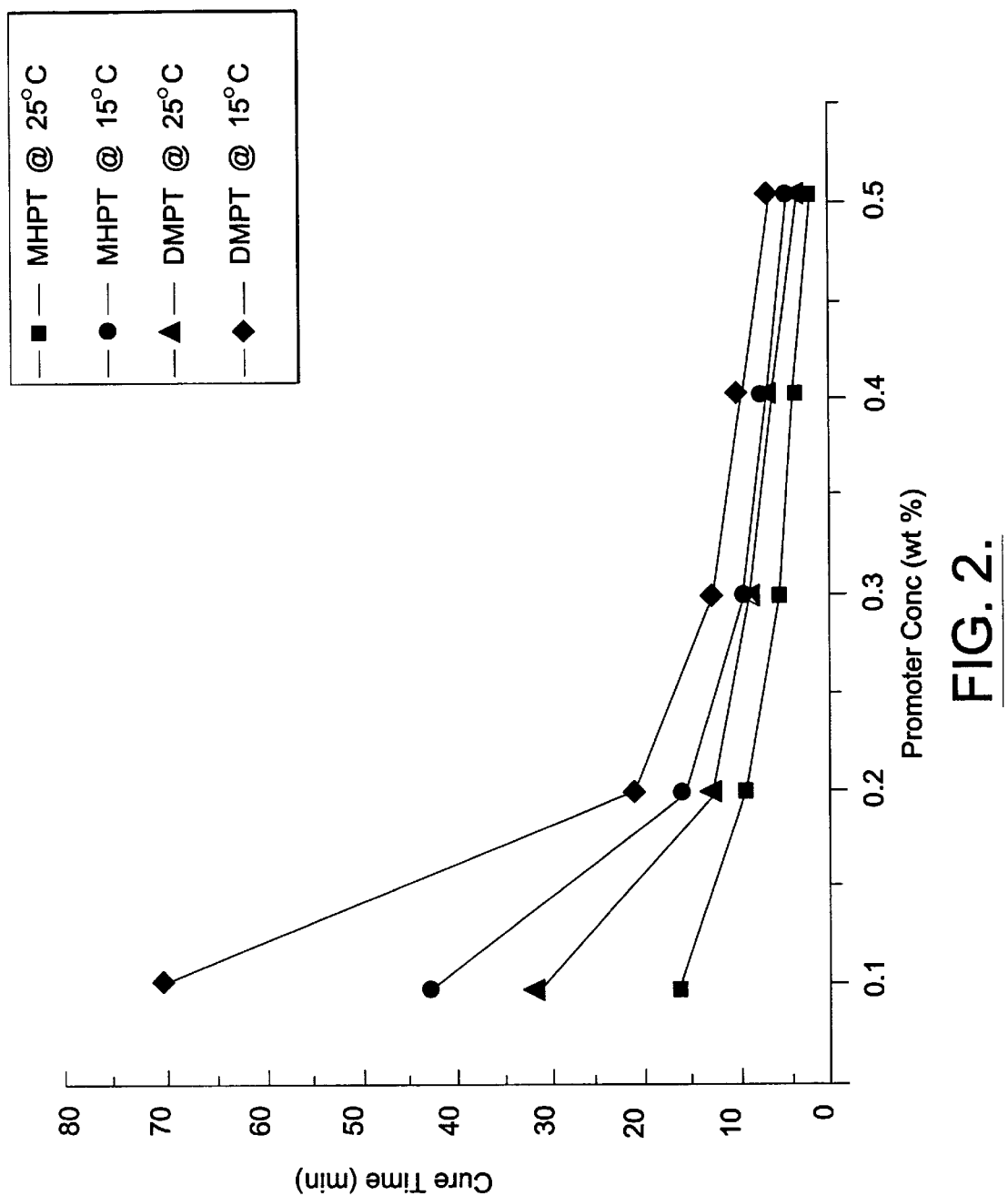
FIG. 2 is a graph illustrating cure time in minutes for an unsaturated polyester resin versus promotor concentration in weight percentage using 1% benzoyl peroxide at 15° C. and at 25° C.

The effect of promotor concentration on the gel and cure times at these two reaction temperatures is depicted in FIGS. 1 and 2. FIG. 1 illustrates that at a promotor level of 0.1%, gel time for MHPT is only about 60% to 70% of the time measured for DMPT. FIG. 2 illustrates that at a promotor level of 0.1%, cure time for MHPT is only about 53% to 60% of the time measured for DMPT. Further, MHPT yielded faster gel and cure times than did DMPT at each tested level of promotor concentration and at each tested temperature.

EXAMPLE 5

Comparison of Gel and Cure Times of MHPT and DMPT at 0° C. and 25° C.

MHPT was also compared to DMPT as a cure reaction promotor using the procedure described above in Example 4, except for the following changes. MHPT was compared to DMPT at five different concentrations (0.4. 0.5, 0.6. 0.7 and 0.8 percent by weight) for the unsaturated polyester resin. Again, all the curing reactions were performed using 1% benzoyl peroxide as initiator at the two different reaction temperatures (in this example 0° C. and 25° C.). The balance of the composition was the polyester resin, Polylite 44-289.

Figure 3:
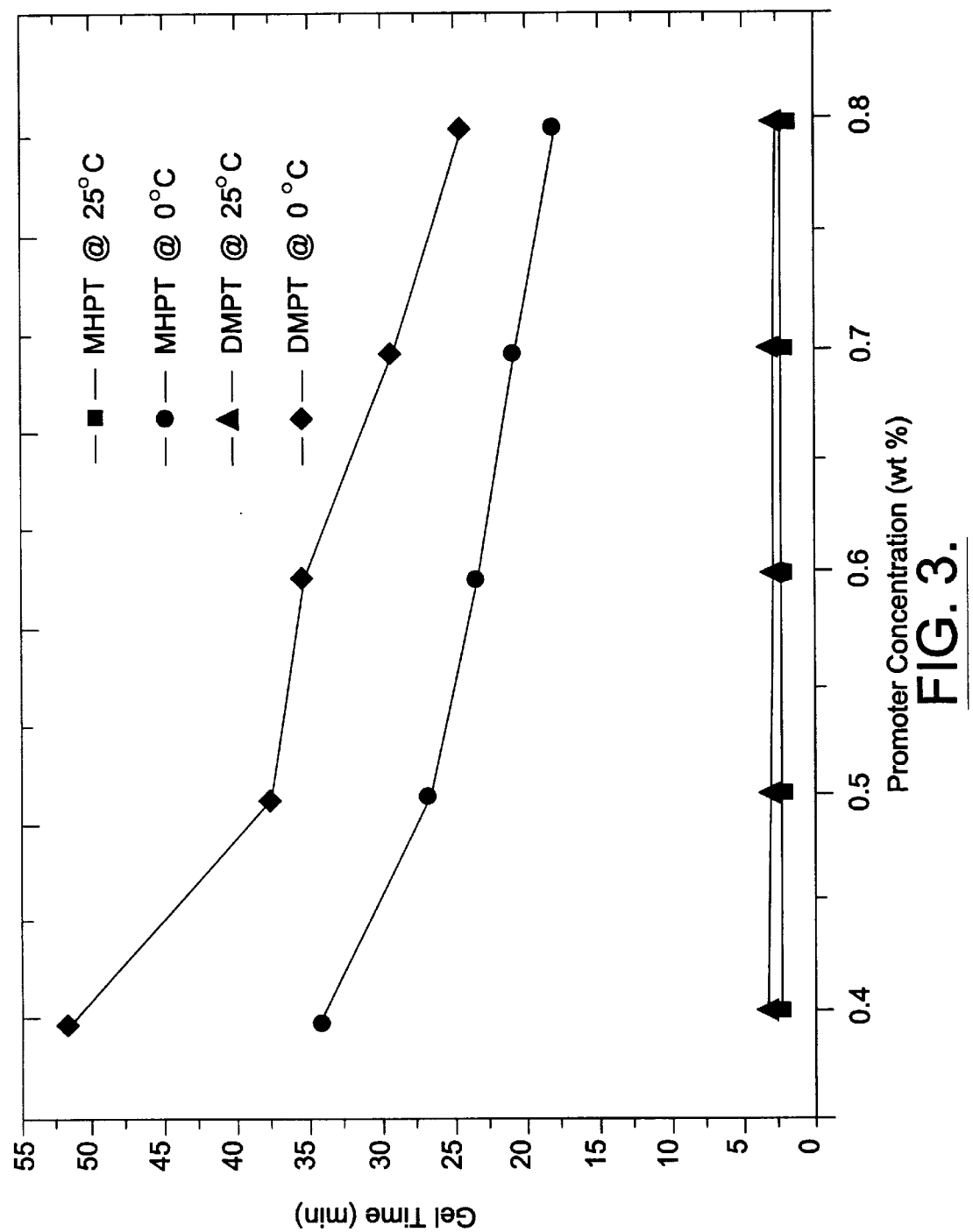
FIG. 3 is a graph illustrating gel time in minutes for an unsaturated polyester resin versus promotor concentration in weight percentage using 1% benzoyl peroxide at 0° C. and at 25° C.
Figure 4:
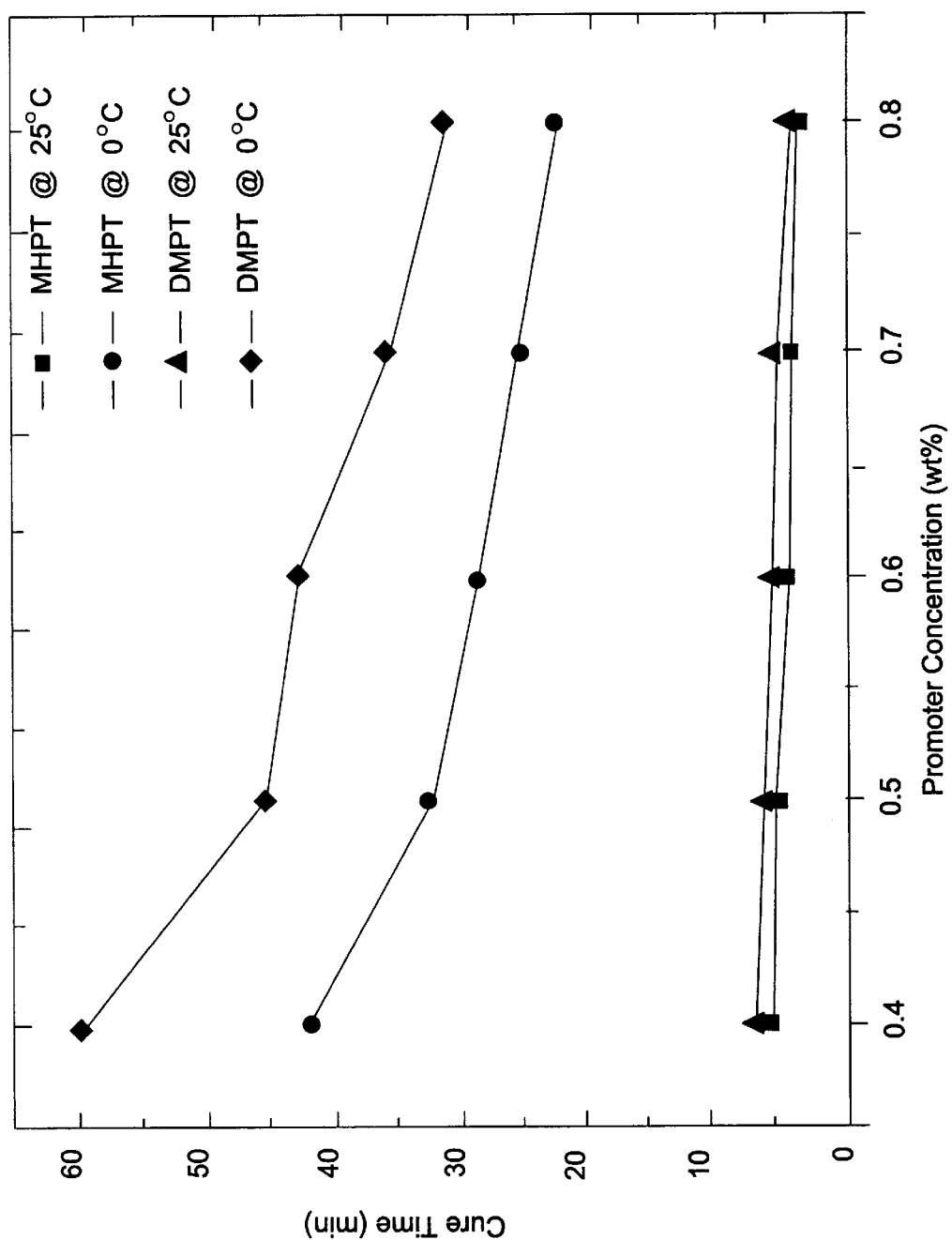
FIG. 4 is a graph illustrating cure time in minutes for an unsaturated polyester resin versus promotor concentration in weight percentage using 1% benzoyl peroxide at 0° C. and at 25° C.

The effect of promotor concentration on the gel and cure times at these two reaction temperatures is depicted in FIGS. 3 and 4. FIGS. 3 and 4 show that MHPT yielded faster gel and cure times than did DMPT at each tested level of promotor concentration and at each tested temperature. FIG. 3 illustrates that at a promotor level of 0.4% and 0° C., gel time for MHPT is only about 65% of the time measured for DMPT. FIG. 4 illustrates that at a promotor level of 0.4% and at 0° C., cure time for MHPT is only about 70% of the time measured for DMPT. Thus, MHPT is particularly advantageous as a cure reaction promotor as compared to DMPT at temperatures approaching 0° C.

EXAMPLE 6

Comparison of Gel and Cure Times of MHPT, EHPT and 2HPMT with Various Tertiary Amines at Ambient Temperature Gel and cure rates of various N-alkyl-(2-hydroxyalkyl)-p-toluidine promoters of the invention (EHPT, 2HPMT, and MHPT) were evaluated as described above in Examples 4 and 5, except the polyester resin used was an unpromoted, low-reactivity resin based on orthophthalic acid and containing 32 to 36 percent free styrene monomer, available under the trade name Polylite 44-285 from Reichhold Chemical Company. Gel and cure rates were evaluated at two different promoter concentrations (0.2 and 0.3 percent by weight). All reactions were performed using 1% benzol peroxide as an initiator at ambient (i.e., 20–25° C.). The balance of the composition was polyester.

The effect of promotor concentration on the gel and cure times is set forth in Table 1 below. DMA is N,N-dimethylaniline; MHA is N-methyl-N-hydroxyethyl-aniline; 3HPMT is N-methyl-(3-hydroxypropyl)-p-toluidine; BDA is N,N-dimethyl-tert-butyl aniline; and DMPT is N,N-dimethyl-p-toluidine.

TABLE 1

| | .2% by Weight | | .3% by Weight | |
|---|---|---|---|---|
| Amine | Gel Seconds | Cure Minutes | Gel Seconds | Cure Minutes |
| DMA | 1980 | 56 | 1275 | 35 |
| MHA | 1765 | 45 | 1140 | 32 |
| 3HPMT | 555 | 26 | 330 | 17 |

TABLE 1-continued

| | .2% by Weight | | .3% by Weight | |
|---|---|---|---|---|
| Amine | Gel Seconds | Cure Minutes | Gel Seconds | Cure Minutes |
| BDA | 560 | 24 | 405 | 18.5 |
| DMPT | 420 | 19 | 265 | 14.5 |
| EHPT | 356 | 17 | 265 | 13.3 |
| 2HPMT | 300 | 16.5 | 217.5 | 11.5 |
| MHPT | 295 | 16 | 245 | 11.8 |

As illustrated in Table 1, the compounds in accordance with the invention yielded faster gel and cure times than did the other amines at each tested level of promotor concentration at ambient temperature. For example, at promoter concentrations of about 0.2% by weight, the compounds of the invention exhibited cure rates of only about 20% of the time measured for DMA. At this same promoter concentration, the compounds of the invention exhibited cure rates of only about 70–75% of the time measured for DMPT, and only about 64–68% of the time measured for 3HPMT (an N-alkyl-N-(3-hydroxypropyl)-p-toluidine).

The foregoing examples are illustrative of the present invention and are not to be construed as limiting thereof. The invention is defined by the following claims, with equivalents of the claims to be included therein.

That which is claimed is:

1. A method for curing crosslinkable unsaturated polymer resins, comprising crosslinking a crosslinkable unsaturated polymer resin with a peroxide initiator in the presence of a promoter according to Formula I

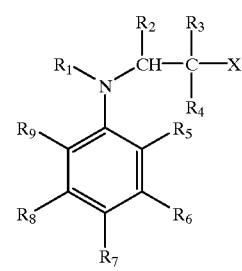

(I)

wherein:
  $R_2$ is H, linear or branched C1 to C6 alkyl, or C3 to C6 cycloalkyl, wherein said C1 to C6 alkyl or C3 to C6 cycloalkyl is optionally substituted at the C1 or C3 position, respectively, by X as defined below;
  $R_3$ and $R_4$ are each independently selected from the group consisting of H, linear or branched C1 to C6 alkyl, and C3 to C6 cycloalkyl;
  $R_5$, $R_6$, $R_8$, and $R_9$ are each independently selected from the group consisting of H, linear or branched C1 to C6 alkyl, C3 to C6 cycloalkyl, and C1 to C6 alkoxy;
  $R_7$ is linear or branched C1 to C6 alkyl, C3 to C6 cycloalkyl or C1 to C6 alkoxy; and
  X is OH, $OR_1$, CN, $OC(O)R_1$, $O[(CH_2)_mO]_nH$ or $O[(CH_2)_mO]_nR_1$, wherein m=1 to 6 and n=1 to 6, and wherein $R_1$ is linear or branched C1 to C6 alkyl or C3 to C6 cycloalkyl.

2. The method of claim 1 wherein:
  X is OH or $O[(CH_2)_mO]_nH$, wherein m=1 to 6 and n=1 to 6.

3. The method of claim 2 wherein:

$R_2$ is H or hydroxymethyl, $R_3$ and $R_4$ are each independently selected from the group consisting of H, methyl, and ethyl; and X is OH or $O[(CH_2)_mO]_nH$, wherein m=2 and n=1 to 6.

4. The method of claim 1, wherein said promoter is selected from the group consisting of N-methyl-N-(2-hydroxyethyl)-p-toluidine (MHPT) and N-methyl-N-(2-hydroxypropyl)-p-toluidine (2HPMT).

5. The method of claim 1, wherein said promoter is present in an amount sufficient to increase the cure rate of said unsaturated resin to about 75% of the cure time of said unsaturated resin measured using N,N-dimethyl-p-toluidine.

6. The method of claim 5, wherein said promoter is present in an amount sufficient to increase the cure rate of said unsaturated resin to about 60% of the cure time of said unsaturated resin measured using N,N-dimethyl-p-toluidine.

7. The method of claim 6, wherein said promoter is present in an amount sufficient to increase the cure rate of said unsaturated resin to about 50% of the cure time of said unsaturated resin measured using N,N-dimethyl-p-toluidine.

8. The method of claim 1, wherein said curing is at ambient temperature.

9. The method of claim 1, wherein said curing is at a temperature about or below 15° C.

10. The method of claim 1, wherein said curing is at a temperature about or below 0° C.

11. The method of claim 1, wherein said promoter is present in an amount between about 0.01 and about 5 percent by weight based on the weight of unsaturated resin.

12. The method of claim 11, wherein said promoter is present in an amount between about 0.1 and about 0.5 percent by weight based on the weight of unsaturated resin.

13. The method of claim 1 wherein said unsaturated resin is selected from the group consisting of polyester, polyurethane, and epoxy resins.

14. The method of claim 13 wherein said unsaturated resin is a polyester resin.

15. A method for curing crosslinkable unsaturated polyester resins, comprising crosslinking a crosslinkable unsaturated polyester resin with a peroxide initiator in the presence of a promoter according to Formula I

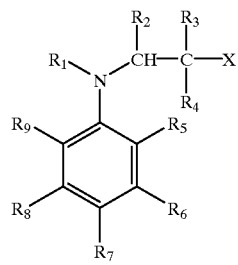

(I)

wherein:

$R_2$ is H or hydroxymethyl;

$R_3$ and $R_4$ are each independently selected from the group consisting of H, methyl and ethyl;

$R_5$, $R_6$, $R_7$, $R_8$ and $R_9$ are each independently selected from the group consisting of H and methyl; and X is OH or $O[(CH_2)_mO]_nH$, wherein m=1 to 6 and n=1 to 6.

16. The method of claim 15, wherein said promoter is present in an amount sufficient to increase the cure rate of said unsaturated polyester resin to about 75% of the cure time of said unsaturated polyester resin measured using N,N-dimethyl-p-toluidine.

17. The method of claim 16, wherein said curing is at a temperature of about or below 0° C.

18. The method of claim 16, wherein said curing is at ambient temperature.

19. A method for curing crosslinkable unsaturated polyester resins, comprising crosslinking a crosslinkable unsaturated polyester resin with a peroxide initiator in the presence of a promoter selected from the group consisting of N-methyl-N-(2-hydroxyethyl)-p-toluidine (MHPT) and N-methyl-N-(2-hydroxypropyl)-p-toluidine (2HPMT).

20. The method of claim 19, wherein said curing is at a temperature of about or below 0° C.

21. The method of claim 19, wherein said curing is at ambient temperature.

22. A method for curing crosslinkable unsaturated polyester resins, comprising crosslinking a crosslinkable unsaturated polyester resin with a peroxide initiator in the presence of a promoter according to Formula I

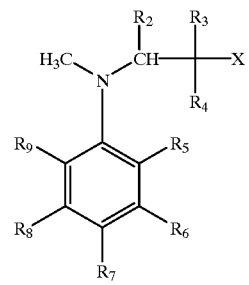

wherein:

$R_2$ is H or hydroxymethyl;

$R_3$ and $R_4$ are each independently selected from the group consisting of H, methyl and ethyl;

$R_5$, $R_6$, $R_7$, $R_8$ and $R_9$ are each independently selected from the group consisting of H and methyl; and X is OH or $O[(CH_2)_mO]_nH$, wherein m=1 to 6 and n=1 to 6, said promoter present in said composition in an amount sufficient to increase the cure rate of said unsaturated polyester resin to about 75% of the cure time of said unsaturated polyester resin measured using N,N-dimethyl-p-toluidine.

23. A method for curing crosslinkable unsaturated polymer resins, comprising crosslinking a crosslinkable unsaturated polymer resin at a temperature of less than about 15° C. with a peroxide initiator in the presence of a promoter according to Formula I

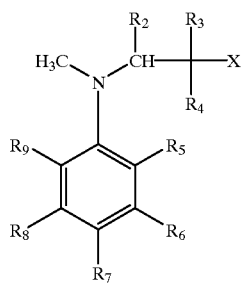

wherein:

R₁ is linear or branched C1 to C6 alkyl or C3 to C6 cycloalkyl;

R₂ is H, linear or branched C1 to C6 alkyl, or C3 to C6 cycloalkyl, wherein said C1 to C6 alkyl or C3 to C6 cycloalkyl is optionally substituted at the C1 or C3 position, respectively, by X as defined below;

R₃ and R₄ are each independently selected from the group consisting of H, linear or branched C1 to C6 alkyl, and C3 to C6 cycloalkyl;

R₅, R₆, R₇, R₈, and R₉ are each independently selected from the group consisting of H, linear or branched C1 to C6 alkyl, C3 to C6 cycloalkyl, and C1 to C6 alkoxy; and X is OH, OR₁, CN, OC(O)R, O[(CH₂)$_m$O]$_n$H or O[(CH₂)$_m$O]$_n$R₁, wherein m=1 to 6 and n=1 to 6, and wherein R₁, is as defined above.

24. The method of claim 23, wherein said curing is at a temperature about or below 0° C.

* * * * *

UNITED STATES PATENT AND TRADEMARK OFFICE
CERTIFICATE OF CORRECTION

PATENT NO.    : 6,258,894 B1                                            Page 1 of 1
DATED         : July 10, 2001
INVENTOR(S)   : Santobianco et al.

It is certified that error appears in the above-identified patent and that said Letters Patent is hereby corrected as shown below:

Column 10,
Formula I, "$R_1$" should read -- $H_3C$ --.

Column 11,
Formula I, "$R_1$" should read -- $H_3C$ --.

Column 12,
Formula I, "CH—X" should read -- CH—C—X --.

Column 13,
Formula I, "CH—X" should read -- CH—C—X --.

Column 14,
Line 12, "R, $_{O[(CH2)m}$" should read -- $R_1$, $O[(CH_2)_m$ --;
Line 14, after "$R_1$" cancel the comma (,).

Signed and Sealed this

Twenty-fourth Day of September, 2002

Attest:

Attesting Officer

JAMES E. ROGAN
Director of the United States Patent and Trademark Office